Sept. 21, 1954  J. A. PERRY  2,689,695
VARIABLE INCIDENCE AIRFOIL MOUNTING
Filed Nov. 10, 1951

INVENTOR.
JOHN A. PERRY
BY Willard S. Grove
ATTORNEY.

Patented Sept. 21, 1954

2,689,695

UNITED STATES PATENT OFFICE 2,689,695

VARIABLE INCIDENCE AIRFOIL MOUNTING

John A. Perry, Phoenix, Ariz.

Application November 10, 1951, Serial No. 255,803

3 Claims. (Cl. 244—48)

This invention is concerned with an improved airplane wing structure and is particularly directed to improvements in the lifting and sustaining wing mechanism of aircraft.

One of the chief objects of this invention is to provide an improved airfoil section for an airplane structure which is pivotally mounted relative to the load or fuselage of the plane so as to automatically adjust its lift and drag with respect to the airflow as determined by the forward speed of the plane so as to automatically compensate for variations in the plane speed, air density or any erratic or incorrect manipulation of the plane by the aviator.

Still another object of this invention is to provide an improved airfoil section for an airplane wing that is pivotally mounted to the frame or fuselage of the plane for swinging movement about an axis lying horizontal and transverse to the normal line of level flight of the plane and in which structure there is provided a stop means for limiting the forward pivotal movement of said wing on the fuselage.

Still another object of this invention is to provide an improved airplane lifting wing structure having a pivotal mounting for the wing located about a horizontal transverse axis on the fuselage of the plane and to provide stop means interacting between the fuselage and the wing to limit swinging movement of said wing structure in the opposite direction from the normal forward movement of the airflow over the wing structure.

Still another object of this invention is to provide an improved lifting wing for an aircraft having a pivotal mounting about a horizontal axis on the fuselage of the plane, said axis lying toward the leading edge of the airfoil section of the pivotally mounted wing and including a stop means interacting between the fuselage and the forward edge of the wing for limiting forward swinging movement of said wing relative to the fuselage.

And still another object of this invention is to provide a swinging wing structure for an aircraft having an airfoil section that is pivotally mounted to one side of said airfoil section and at a point more closely related to the leading edge than the trailing edge of said airfoil section, said pivotal mounting being connected to the load or fuselage of the member being carried and in which there is a stop means mounted on the fuselage and engaging the wing structure to limit its forward swinging movement to predetermined positions.

Further features and advantages of this invention will appear from a detailed description of the drawings in which.

Figures 1, 2, 3:
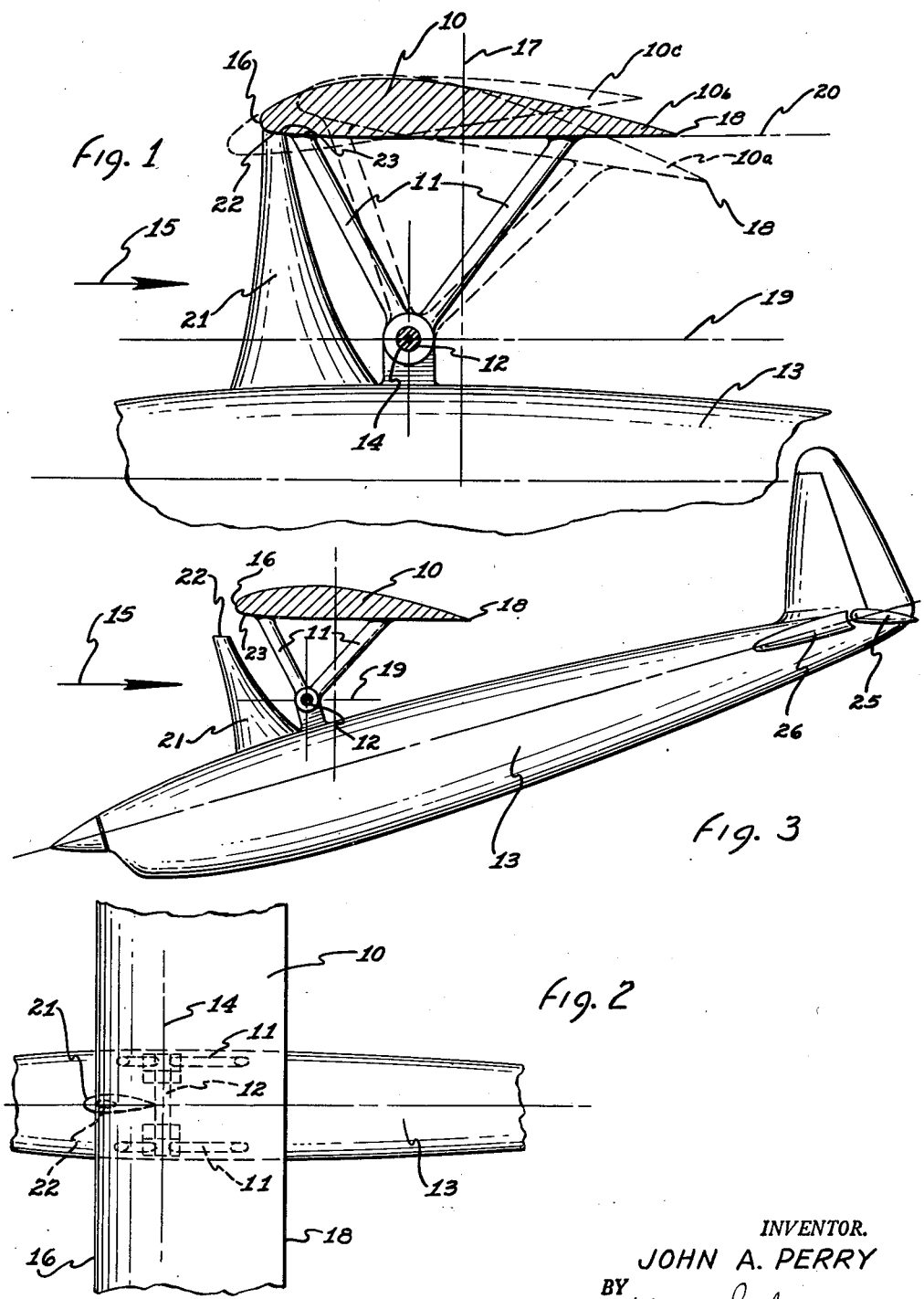
Fig. 1 is an enlarged fragmentary side elevation of an aircraft structure incorporating the features of this invention.
Fig. 2 is a fragmentary plan view of the subject matter shown in Fig. 1.
Fig. 3 is a side elevation of an aircraft operating in rapid dive condition illustrating one form of operation of this invention.

For exemplary purposes there is shown a conventional airfoil section or wing structure 10 which is connected by suitable supporting frame work or struts 11 to a rock or pivot shaft 12 carried on the fuselage 13 of the aircraft, such structure being substantially like that shown in my copending patent application, Serial No. 201,378, filed December 18, 1950, and now abandoned. In this type of wing structure it is to be noted that the axis of swinging movement 14 about the shaft 12 is located toward the direction of airflow as indicated by the arrow 15 and therefore toward the leading edge 16 of the airfoil section 10 relative to a center line 17 of the airfoil section 10 located intermediate the leading edges 16 and the trailing edge 18 thereof. It is also to be noted that the axis 14 of pivoting is preferably below the wing section 10 by a distance of approximately one-half the overall length of the airfoil section between the leading edge 16 and the trailing edge 18, as indicated by the distance between the lines 19 and 20.

Experience has shown that with increase of air speed, as indicated by the arrow 15, the wing structure above described moves counterclockwise as shown in Fig. 1, from a position 10a to the position 10b and that decreasing air speeds tend to cause the wing to again rock backwardly in a clockwise direction toward the position 10a. The position 10a in Fig. 1 is that position assumed under normal average air speed or flight conditions. When excessive speeds are encountered the airfoil section will rock toward a position 10c to the point where the wing 10 will finally arrive at a zero lift position or at an angle of attack such that there is no positive direct lifting control for the fuselage and wing section. The wing under these conditions will flutter or lack positive and definite directive control and lift. In order to avoid this situation, there is provided a stop means such as the pedestal 21 fixed to the fuselage 13 and having a wing abutment surface 22 which engages the under side 23 of the wing adjacent the leading edge 16 so as to limit the forward rocking movement of the wing under all conditions to a normal flight position 10b. As a result erratic manipulation of the plane such as sudden diving or too fast a descent as in coming in for a landing, as seen in Fig. 3, allows the wing structure to rock backwardly relative to the stop post and stop abutment surface 22 as shown in Fig. 3 so that the wing section 10 is not inadvertently moved into the position 10c of non-lift and control thus preventing the plane from getting momentarily out of control under critical conditions of rapid diving, too fast a flight or coming in for a landing at too steep a glide angle. It will be noted in Fig. 3 that the surface 22 of the pedestal 21 rocks away from the wing 10 allowing the wing to maintain its more normal angle of attack with the direction of airflow 15 so as to maintain proper lift for the plane under these abnormal operating conditions. As a result the plane automatically is controlled for safe landing and manipulation under such conditions.

It will therefore be noted that the wing structure 10 is limited in its forward pivotal movement relative to the fuselage by the pedestal 21 and its abutment surface 22 while at the same time allowing freedom of backward swinging movement of the wing section 10 relative to the fuselage in cases of sudden change of direction of the fuselage brought about by the manipulation of the tail surfaces 25 and 26 as indicated in Fig. 3.

While the apparatus herein disclosed and described constitutes a preferred form of the invention, it is also to be understood that the apparatus is capable of mechanical alteration without departing from the spirit of the invention and that such mechanical arrangement and commercial adaptation as fall within the scope of the appendent claims are intended to be included herein.

Having thus fully set forth and described this invention what is claimed is:

1. An airplane structure comprising, a fuselage, an airfoil pivotally mounted for free forward and rearward rocking movement about a horizontal transverse axis of rocking movement on said fuselage for bodily movement fore and aft of the fuselage of said plane, said horizontal transverse axis being located more closely to the leading edge of said airfoil than the trailing edge thereof and located below said airfoil section during normal flight, stop means fixed on said fuselage, an abutment surface on said stop means engaging the leading edge of said airfoil to limit forward rocking movement of said airfoil, whereby said airfoil will assume a position substantially parallel to the direction of the relative wind as regards the wing under normal air speed flight conditions.

2. An airplane structure comprising a fuselage, an automatic compensating wing pivotally mounted on said fuselage for free bodily forward and rearward swinging movement about a horizontal transverse axis fore and aft of said fuselage, stop means comprising a pedestal member fixed on said fuselage in front of said axis of pivotal movement of said wing on said fuselage, an abutment surface on top of said pedestal member located to engage the under surface of said wing adjacent the leading edge thereof to limit said free forward pivotal movement of said wing, whereby said airfoil will assume a position substantially parallel to the direction of the relative wind as regards the wing under normal air speed flight conditions.

3. An airplane structure comprising, a fuselage, an airfoil, means for pivotally mounting said airfoil on a transverse horizontal axis on said fuselage of said plane for free bodily swinging movement about said axis fore and aft of said fuselage substantially parallel to the relative wind, a stop means on said fuselage, an abutment surface on said stop means engaging said airfoil so as to limit forward free swinging motion of said airfoil on said fuselage to a position corresponding to the angle of attack of said airfoil under normal air speed flight conditions.

References Cited in the file of this patent

UNITED STATES PATENTS

| Number | Name | Date |
|---|---|---|
| 1,368,150 | Holgerson | Feb. 8, 1921 |
| 1,478,270 | Trunko | Dec. 18, 1923 |
| 1,728,575 | Rodene | Sept. 17, 1929 |
| 1,743,967 | Haskell | Jan. 14, 1930 |
| 1,844,448 | Sramek | Feb. 9, 1932 |
| 2,428,194 | Bockrath | Sept. 30, 1947 |
| 2,623,712 | Spratt | Dec. 30, 1952 |